US012259779B2

(12) United States Patent
Nigudkar et al.

(10) Patent No.: US 12,259,779 B2
(45) Date of Patent: Mar. 25, 2025

(54) TECHWIKI—COMPUTER DIAGNOSTICS USING QUANTUM ANNEALING AND BLOCKCHAIN FRAMEWORK

(71) Applicant: Bank of America Corporation, Charlotte, NC (US)

(72) Inventors: Avinash Nigudkar, Mumbai (IN); Vijay Kumar Battiprolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/134,713

(22) Filed: Apr. 14, 2023

(65) Prior Publication Data

US 2024/0345910 A1    Oct. 17, 2024

(51) Int. Cl.
| | | |
|---|---|---|
| G06F 11/00 | (2006.01) | |
| G06F 11/07 | (2006.01) | |
| G06F 16/23 | (2019.01) | |
| G06N 10/70 | (2022.01) | |

(52) U.S. Cl.
CPC ........ *G06F 11/079* (2013.01); *G06F 11/0709* (2013.01); *G06F 16/2379* (2019.01); *G06N 10/70* (2022.01)

(58) Field of Classification Search
CPC ............... G06F 11/079; G06F 11/0709; G06F 11/0793; G06F 16/2379; G06N 10/70
See application file for complete search history.

(56) References Cited

U.S. PATENT DOCUMENTS

| | | | |
|---|---|---|---|
| 9,642,024 | B2 | 5/2017 | Reed et al. |
| 10,069,573 | B2 | 9/2018 | Krovi et al. |
| 10,268,964 | B2 | 4/2019 | Changiz Rezaei et al. |
| 10,671,472 | B2 | 6/2020 | Gokhale et al. |
| 11,010,285 | B2 | 5/2021 | Hicks et al. |
| 11,057,266 | B2 | 7/2021 | Jain et al. |
| 11,106,524 | B1 * | 8/2021 | Csabi ................. G06F 11/0793 |
| 2009/0299947 | A1 | 12/2009 | Amin et al. |

(Continued)

OTHER PUBLICATIONS

Wikipedia, Quantum Annealing, The Free Encyclopedia, pp. 1-8, <https://en.wikipedia.org/wiki/Quantum_annealing>.

(Continued)

*Primary Examiner* — Joseph D Manoskey
(74) *Attorney, Agent, or Firm* — Banner & Witcoff, Ltd.

(57) ABSTRACT

A quantum computing system for determining diagnostic solutions for detected faults in computing devices using at least quantum annealing is described. The quantum computing system takes advantage of superposition and entanglement properties of qubits. A plurality of qubits is initialized into states representing historical data associated with historical faults and historical diagnostic solutions. Couplers entangle the plurality of qubits together based on the detected fault, generating a set of states in uniform superposition. Biases influence the energy levels of the set of states based on the detected fault. The quantum computing system measures a state with the lowest energy level within the set of states to determine diagnostic solutions to the detected fault. The system may further leverage a blockchain ledger for securely storing and accessing historical data associated with historical faults and historical diagnostic solutions.

18 Claims, 8 Drawing Sheets

(56) References Cited

U.S. PATENT DOCUMENTS

| | | | | |
|---|---|---|---|---|
| 2019/0026645 | A1* | 1/2019 | Correll | G06F 11/079 |
| 2021/0004305 | A1* | 1/2021 | Hao | G06F 11/079 |
| 2023/0094389 | A1* | 3/2023 | You | G06N 5/01 |
| | | | | 706/62 |
| 2024/0078459 | A1* | 3/2024 | Feldman | G06N 10/20 |
| 2024/0176730 | A1* | 5/2024 | Dauber | G06F 11/3688 |

OTHER PUBLICATIONS

Sheir Yarkoni, et al., Quantum Annealing for Industry Applications: Introduction and Review, ArXiv.org, Dec. 14, 2021, pp. 1-43, <https://arxiv.org/pdf/2112.07491.pdf>.

What is Quantum Annealing? D-Wave System Documentation documentation, pp. 1-5, (dwavesys.com) <https://docs.dwavesys.com/docs/latest/c_gs_2.html>.

Warren, Richard H., Gates for Adiabatic Quantum Computing, May 7, 2014, pp. 1-19, (arxiv.org) <https://arxiv.brg/ftp/arxiv/papers/1405/1405.2354.pdf>.

Ken Moriwaki, Exploration of Quantum Computing: Solving Optimisation Problem Using Quantum Annealer, Towards Data Science, Jul. 27, 2022, pp. 1-14, <https://towardsdatascience.com/exploration-of-quantum-computing-solving-optimisation-problem-using-quantum-annealer-77c349671969>.

Parab Pranav, Quantum Annealing Process, XpertUp, Aug. 22, 2020 <https://www.xpertup.com/blog/quantum-computing/quantum-annealing-process/>.

* cited by examiner

TECHWIKI—COMPUTER DIAGNOSTICS USING QUANTUM ANNEALING AND BLOCKCHAIN FRAMEWORK

TECHNICAL FIELD

Aspects of the disclosure relate to quantum computing, and more specifically, the application of quantum annealing and blockchain-based systems for improved accuracy in determining diagnostic solutions for various computer-related faults and issues.

BACKGROUND

Troubleshooting a computer is a knowledge-intensive task and a simple problem could take hours or even days to solve. In an increasingly competitive marketplace, system complexity continues to grow, but time-to-market and lifecycle are reducing.

The purpose of fault diagnosis is the isolation of faults on defective systems, a task requiring a high skill set. Timely and proper fault diagnosis is critical for improving product yield and reducing troubleshooting costs. However, it is very challenging to identify the root cause of failures on a complex software/hardware issue. Ambiguous diagnosis results lead to long debug times and even wrong repair actions, which significantly increases repair cost and time.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various fault diagnosis issues associated with defective devices, systems, and networks. One or more of the aspects herein relate to the use of quantum computing to provide proper and timely fault diagnosis solutions to various computer software, hardware, network, or operating system fault issues. Additional aspects herein relate to a blockchain based peer to peer network integrated with a quantum computer for enhanced security and storage.

These and additional aspects will be appreciated with the benefit of the disclosures discussed in further detail below.

In accordance with one or more embodiments, a system for determining diagnostic solutions to detected faults on a computing device using quantum annealing is described. The system may comprise a computing device, a database, a plurality of network nodes in a peer-to-peer (P2P) network storing a blockchain ledger, and a quantum computer. The quantum computer may comprise a quantum processor comprising couplers, biases, a plurality of qubits, and memory storing computer-readable instructions that, when executed by the quantum processor, cause the quantum computer to perform one or more functions described herein. The quantum computer may receive a detected fault empirical data representing the detected fault on the computing device. The quantum computer may receive historical data associated with historical faults and historical diagnostic solutions. The quantum computer initializes a plurality of qubits into states representing the historical data. The couplers entangle the plurality of qubits together based on the detected fault empirical data according to a first configuration. A first set of states in uniform superposition is generated based on the detected fault empirical data according to the first configuration. The first set of states are measured in terms of energy levels. The biases influence the energy levels of the first set of states based on the detected fault empirical data according to the first configuration. The quantum computer may measure a state with the lowest energy level within the first set of states to determine first diagnostic solutions to the detected fault. The quantum computer sends the first diagnostic solutions to the computing device. The computing device troubleshoots the detected fault according to the first diagnostic solutions.

In some embodiments, a network node in the (P2P) network sends the historical data associated with historical faults and historical diagnostic solutions to the quantum computer. The network node stores a blockchain ledger in a data store. The P2P network comprises a plurality of network nodes for performing operations on the blockchain ledger. The blockchain ledger stores the historical data associated with historical faults and historical diagnostic solutions.

In some embodiments, the quantum computer sends the first diagnostic solutions to a database. The database updates the historical data stored in the database based on the first diagnostic solutions. The database then sends the updated historical data to the network node.

In some embodiments, the network node is configured to receive the updated historical data from the database. The network node adds the updated historical data to the blockchain ledger.

In some embodiments, the plurality of network nodes in the P2P network are configured to add software faults, hardware faults, networking faults, operating system faults, historical diagnostic solutions, or specific use cases to the blockchain ledger through a secure log-in interface on the P2P network.

In some embodiments, the system includes an enterprise solutions platform. The enterprise solutions platform comprises a digital copy or replica of the blockchain ledger, artificial reality/virtual reality (AR/VR) simulation modules, and/or a remote assistance graphical user interface (GUI). The enterprise solutions platform may be accessed by a user or technician attempting to manually diagnosis and solve a specific fault detected on a computing device. The specific fault detected on the computing device is input into the remote assistance GUI. The remote assistance GUI transmits the specific fault detected by the computing device to the AR/VR simulation modules. The AR/VR simulation modules extract the historical data associated with historical faults and historical diagnostic solutions from the digital copy of the blockchain ledger. The AR/VR simulation modules process the historical data based on the specific fault. The AR/VR simulation modules generate interactive AR/VR data for display on the remote assistance GUI representing specific diagnostic solutions to the specific fault detected by the computing device. The computing device troubleshoots the specific fault according to the specific diagnostic solutions.

In some embodiments, the couplers are programmed by a coupling strength parameter and the biases are programmed by a bias strength parameter based on the detected fault empirical data.

In some embodiments, the couplers entangle the plurality of qubits together based on the detected fault empirical data according to a second configuration. A second set of states in uniform superposition is generated based on the detected fault empirical data according to the second configuration. The second set of states are measured in terms of energy levels. The biases influence the energy levels of the second set of states based on the detected fault empirical data according to the second configuration. The quantum computer may measure a state with the lowest energy level within the second set of states to determine second diagnostic solutions to the detected fault.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
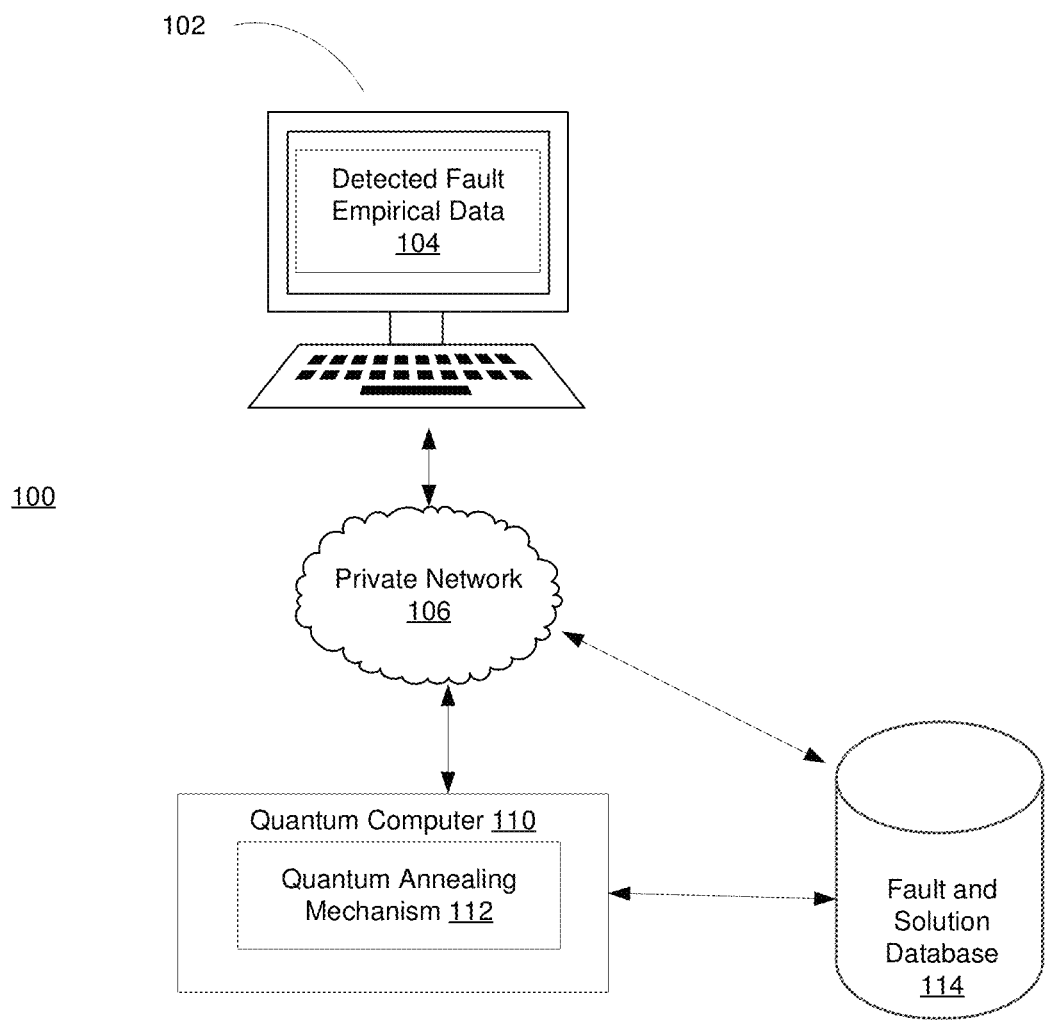
FIG. 1 illustrates an example computing environment for determining diagnostic solutions for a detected fault in a computing device using quantum annealing in accordance with one or more illustrative aspects described herein.

FIG. 1 illustrates an example computing environment 100 for determining diagnostic solutions for a detected fault in computing devices using quantum annealing and a database. The computing environment 100 may comprise one or more devices (e.g. computing devices, computer systems, communication devices, and the like) that may be connected via one or more networks (e.g. a private network 106 and/or a public network). The computing environment 100 may comprise a user computing device 102, a quantum computer 110, and a fault and solution database 114.

The user computing device 102 may detect a fault within itself. The detected fault may relate to software, hardware, network, or operating system fault issues associated with the user computing device 102. The detected fault in the user computing device 102 may generate detected fault empirical data 104 representing the detected fault on the user computing device 102. For example, the detected fault may be a hardware fault related to a processor in the user computing device attempting to write to out of bounds memory addresses in a computer-readable memory. When the processor is unable to write to the out of bounds memory addresses, the user computing device may generate an error code, which is the detected fault empirical data, that the processor is attempting to access out of bounds memory address in the computer-readable memory. The user computing device 102 may transmit the detected fault empirical data 104 to the quantum computer 110 via the private network 106.

In some embodiments, the fault and solution database 114 stores historical data associated with historical faults and historical diagnostic solutions acquired from the user computing device 102 or other computing devices on the private network 106 and/or a public network. The quantum computer 110 may receive the historical data associated with historical faults and historical diagnostic solutions from the fault and solution database 114. The quantum computer 110 may store the historical data in memory for use by the quantum annealing mechanism 112.

The quantum computer 110 includes a quantum annealing mechanism 112. The quantum annealing mechanism 112 may initialize a plurality of qubits into states representing the historical data associated with historical faults and historical diagnostic solutions. The quantum annealing mechanism 112 may also have couplers programmed by a coupler strength parameter and biases programmed by a bias strength parameter. The coupler strength parameter and bias strength parameter are programmed according to the detected fault empirical data 104 in order to determine diagnostic solutions for the detected fault on the user computing device 102. The couplers and biases are applied to the plurality of qubits based on the detected fault empirical data according to a first configuration. The couplers entangle the plurality of qubits together, generating a set of states in uniform superposition. The set of states are measured in terms of energy levels. The biases influence the energy levels of the set of states. The quantum annealing mechanism may measure a state with the lowest energy level within the set of states to determine diagnostic solutions to the detected fault. The quantum computer 110 transmits the diagnostic solutions to the detected fault on the user computing device 102 to the fault and solution database 114. Further details associated with the quantum annealing mechanism are described with respect to FIG. 3.

The fault and solution database 114 may store the diagnostic solutions to the detected fault on the user computing device 102, updating the historical data associated with historical faults and historical diagnostic solutions. The fault and solution database 114 may transmit the diagnostic solutions to the user computing device 102. The user computing device 102 troubleshoots the detected fault according to the diagnostic solutions.

Figure 2A:
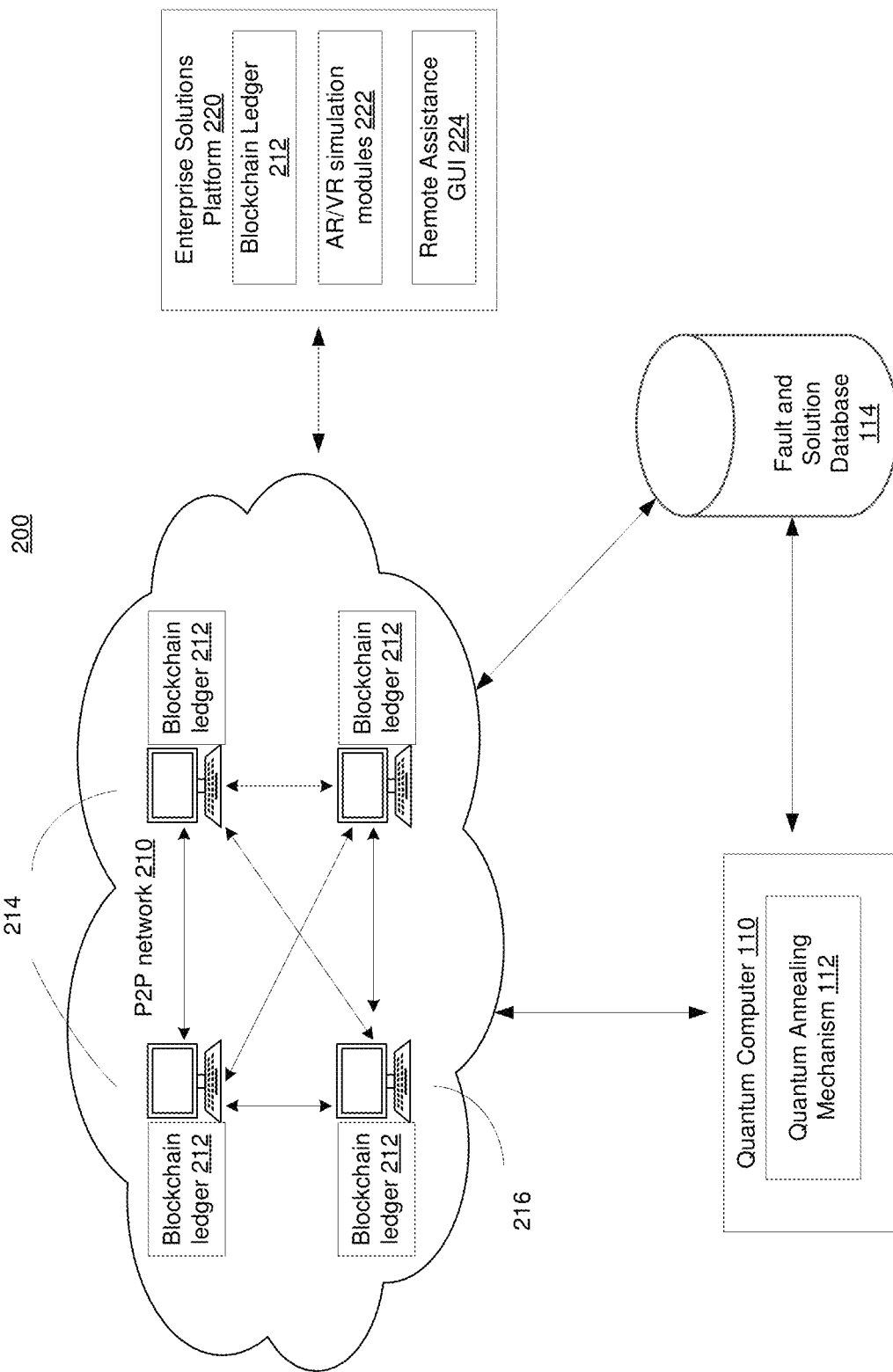
FIG. 2A illustrates an example computing environment for determining diagnostic solutions for detected faults in computing devices using quantum annealing in accordance with one or more illustrative aspects described herein.

FIG. 2A illustrates an example computing environment 200 for determining diagnostic solutions for detected faults in computing devices on a peer-to-peer (P2P) network 210 using quantum annealing and a blockchain ledger 212. The computing environment 200 may include a blockchain ledger 212, one or more user computing devices 214, one or more technician computing devices 216, a quantum computer 110, a fault and solution database 114, and/or an enterprise solutions platform 220.

In more detail, the P2P network 210 may be specialized for the purpose of managing a blockchain ledger 212 storing various data blocks associated with historical faults in computing devices and historical diagnostic solutions. The P2P network may be comprised of a decentralized infrastructure consisting of a plurality computing devices which serve as network nodes to create and sustain a decentralized P2P network (e.g., decentralized network). Each of the network nodes may have a complete or partial replica of a blockchain ledger 212 stored in memory and may operate in concert, based on digital cryptographic hash functions, consensus algorithms, digital signature information, and network-specific protocols, to execute network functions and/or maintain inter-nodal agreement as to the state of the blockchain ledger 212. In some instances, a plurality of network function requests may be broadcasted across at least a portion of the network nodes of the P2P network and aggregated through execution of the one or more digital cryptographic hash functions and by performance of the one or more consensus algorithms to generate a single work unit (e.g., a block representing empirical data associated with detected faults and historical diagnostic solutions for computing devices), which may be added in a time-based, chronological manner to the blockchain ledger 212 through performance of network-specific protocols.

The term "blockchain ledger", as used herein, refers to a concatenation of sequentially dependent data elements (e.g., blocks) acting as a data ledger that stores records relating to a historical faults and historical diagnostic solutions for computing devices. Such data records may be related to those used by a particular entity or enterprise, such as a financial institution or software vendor, and/or may be used by users of a computing device or technicians for solving computer related faults. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as network nodes within the decentralized private network, but still have proper credentials. A "public blockchain" may refer to a blockchain of a decentralized public system in which any computing devices may be permitted to act as network nodes in a decentralized public network and have access to the public blockchain. In some instances, the public blockchain may be viewable and/or accessible by computing devices which are not participating as network nodes within the decentralized public network. The blockchain ledger 212 may be a public or private blockchain. The computing devices on the P2P network 210 act as network nodes for performing operations on the blockchain ledger 212.

In some embodiments, the blockchain ledger 212 stores historical data associated with historical faults and historical diagnostic solutions acquired from user computing devices 214 in the P2P network 210. For example, users and technicians may securely join the P2P network 210 through a secure log-in interface on a computing device to input software faults, hardware faults, networking faults, operating system faults, historical diagnostic solutions, or specific use cases.

In one embodiment, a user computing device 214 may detect a fault within itself. The detected fault may relate to software, hardware, network, or operating system fault issues associated with the user computing device 214. The detected fault in the user computing device 214 may generate detected fault empirical data 104 representing the detected fault. The user computing device 214 may store the detected fault empirical data 104 in the blockchain ledger 212 and then transmit the detected fault empirical data 104 to the quantum computer 110.

In some embodiments, the fault and solution database 114 stores historical data associated with historical faults and historical diagnostic solutions acquired from user computing devices 214 in the P2P network 210. The quantum computer 110 may receive the historical data associated with historical faults and historical diagnostic solutions acquired from user computing devices 214 in the P2P network 210 from a network node storing the blockchain ledger 212 in a data store and/or a memory, or from the fault and solution database 114. The quantum computer 110 may store the historical data in memory for use by the quantum annealing mechanism 112.

The quantum computer 110 includes a quantum annealing mechanism 112. The quantum annealing mechanism 112 may initialize a plurality of qubits into states representing the historical data associated with historical faults and historical diagnostic solutions acquired from user computing devices 214 in the P2P network 210. The quantum annealing mechanism 112 may also have couplers programmed by a coupler strength parameter and biases programmed by a bias strength parameter. The coupler strength parameter and bias strength parameter are programmed according to the detected fault empirical data 104 in order to determine diagnostic solutions for the detected fault on the user computing device 214. The couplers and biases are applied to the plurality of qubits in a configuration based on the detected fault empirical data. The couplers entangle the plurality of qubits together, generating a set of states in uniform superposition. The set of states are measured in terms of energy levels. The biases influence the energy levels of the set of states. The quantum annealing mechanism may measure a state with the lowest energy level within the set of states to determine diagnostic solutions to the detected fault. The quantum computer 110 transmits the diagnostic solutions to the detected fault on the user computing device 214 to the fault and solution database 114. Further details associated with the quantum annealing mechanism are described with respect to FIG. 3.

The fault and solution database 114 may store the diagnostic solutions to the detected fault on the user computing device 214, updating the historical data associated with historical faults and historical diagnostic solutions acquired from user computing devices 214 in the P2P network 210. The fault and solution database 114 may transmit the updated historical data to the user computing device 214. The user computing device 214, acting as a network node in the P2P network 210, may store the updated historical data on the blockchain ledger 212 for use by other network nodes in the P2P network 210. In one example, network nodes in the P2P network 210 may read historical data from the blockchain ledger to determine historical diagnostic solutions to faults detected on the plurality of computing devices.

The user computing device 214 may then troubleshoot the detected fault on the user computing device 214 according to the diagnostic solutions. In some examples, a technician may remotely connect to the user computing device 214 by a technician computing device 216 in the P2P network to troubleshoot the detected fault on the user computing device 214. The technician computing device 216 may remotely connect to the user computing device 214 through a virtual machine, software applications, a virtual private network (VPN), and/or other secure remote connections.

In some embodiments, the computing environment 200 includes an enterprise solutions platform 220. The enterprise solutions platform 220 may include a digital copy or replica of the blockchain ledger 212, artificial reality/virtual reality (AR/VR) simulation modules 222, a remote assistance graphical user interface (GUI) 224 and/or other devices and/or modules and the like. The enterprise solutions platform 220 may be accessed by a user or technician through a device such as a computing device, tablet, phone, and/or other like devices. The enterprise solutions platform 220 may be accessed by a user or technician attempting to manually diagnosis and solve a specific fault detected on a computing device. A user or technician may input a specific fault detected by a computing device on the P2P network 210 using the remote assistance GUI 224. The specific fault detected by the computing device is transmitted to the AR/VR simulation modules 222. The digital copy of the blockchain ledger 212 is used by the AR/VR simulation modules 222 to extract the historical data associated with historical faults and historical diagnostic solutions acquired from user computing devices 214 in the P2P network 210. The AR/VR simulation modules may process the historical data based on the specific fault. The AR/VR simulation modules 222 may generate interactive AR/VR data for display on the remote assistance GUI 224 representing specific diagnostic solutions to the specific fault detected by the computing device. A user or technician may then troubleshoot the specific fault on the computing device according to the specific diagnostic solutions. Further details associated with the enterprise solutions platform are described with respect to FIG. 4.

Figure 2B:
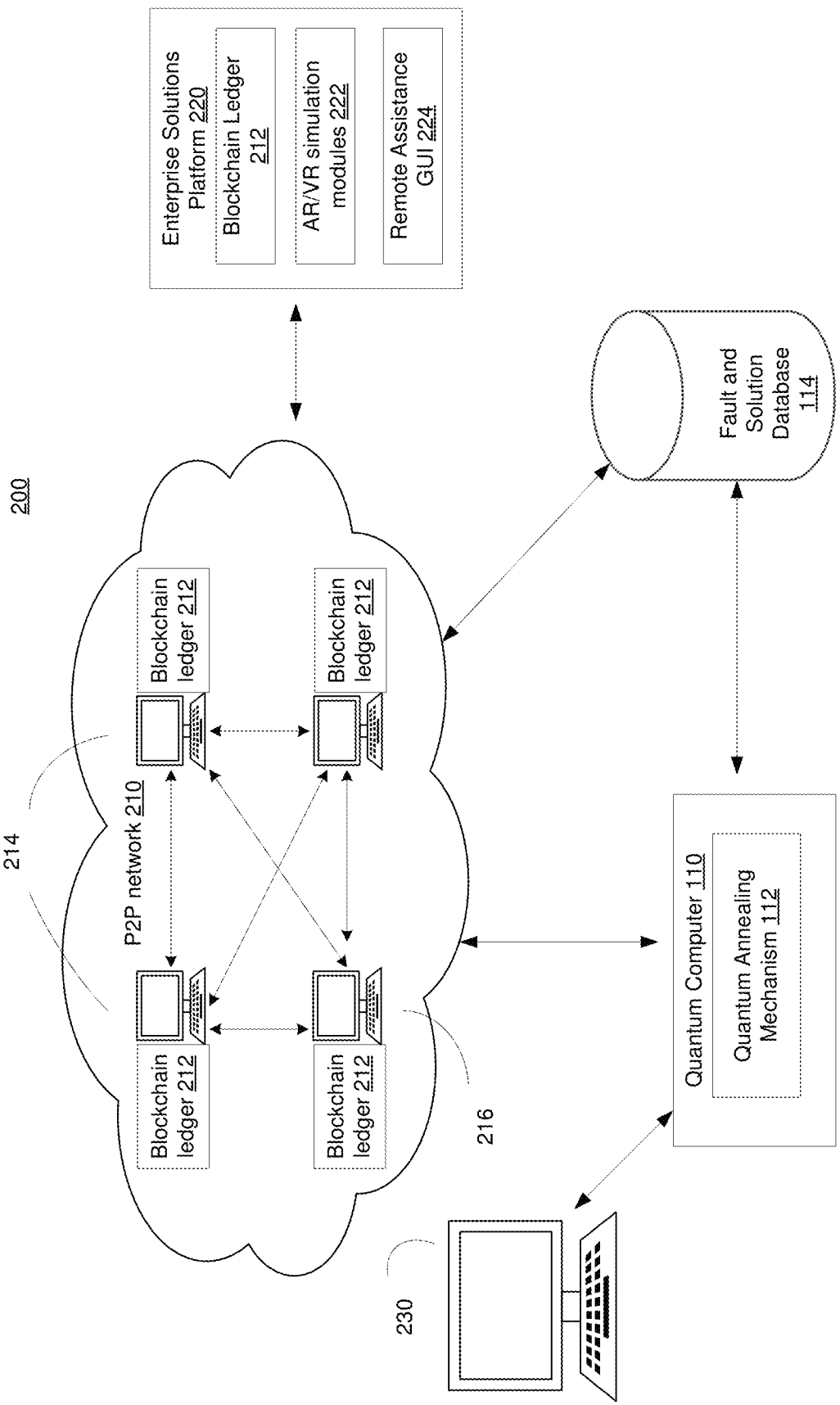
FIG. 2B illustrates an example computing environment for determining diagnostic solutions for detected faults in computing devices using quantum annealing in accordance with one or more illustrative aspects described herein.

FIG. 2B illustrates an example computing environment 200 for determining diagnostic solutions for detected faults in a computing device using quantum annealing and a blockchain ledger 212. The computing device 230 is not in the P2P network 210. In this example, the computing device 230 may detect a fault within itself. The detected fault in the computing device 230 may generate detected fault empirical data representing the detected fault on the computing device 230. The user computing device 230 may transmit the detected fault empirical data to the quantum computer 110 via a private or public network. After the quantum computer 110 determines diagnostic solutions to the detected fault, the quantum computer 110 sends the diagnostic solutions to the computing device 230. The computing device 230 troubleshoots the detected fault according to the diagnostic solutions.

Figure 3:
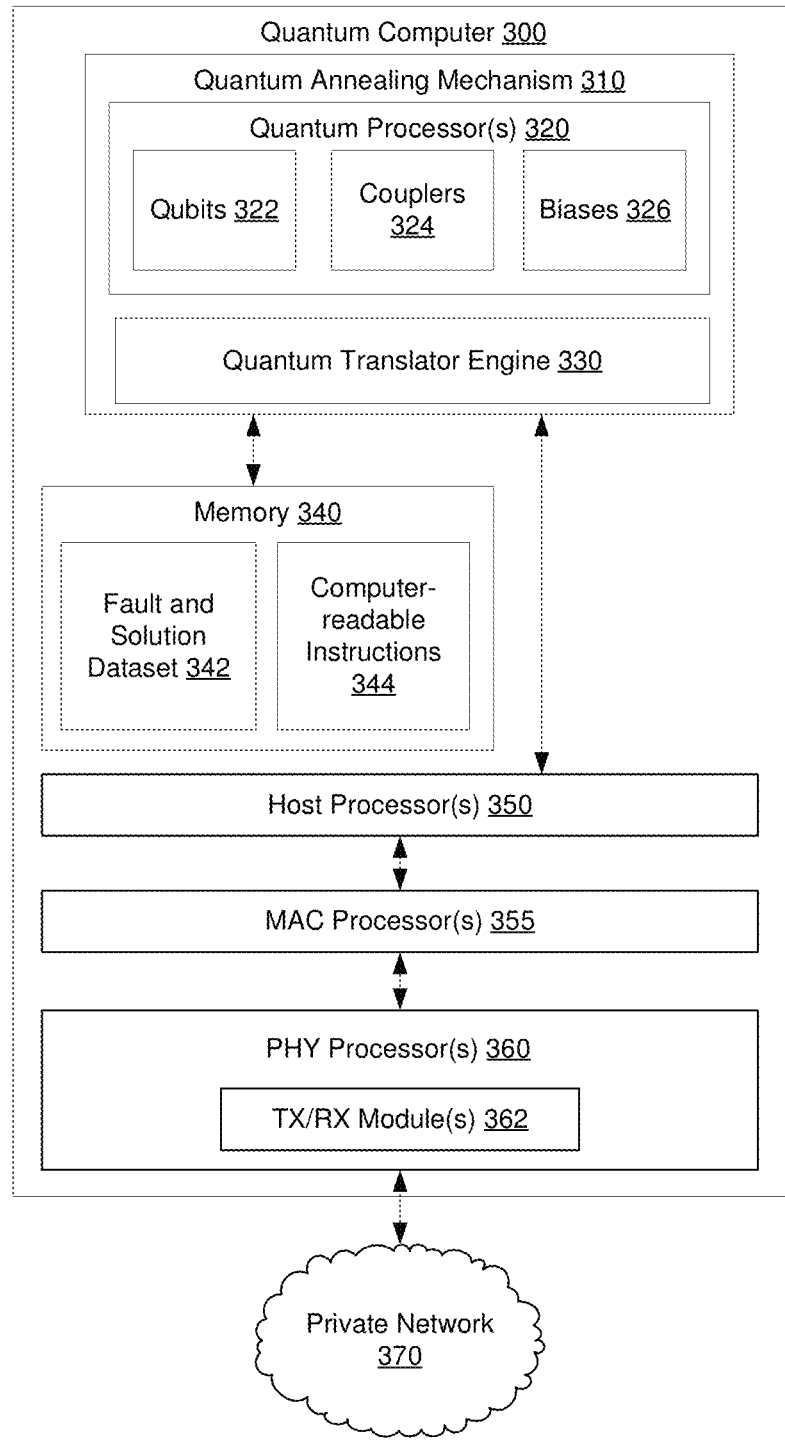
FIG. 3 illustrates an example quantum computer for applying quantum annealing to determine diagnostic solutions for detected faults in computing devices in accordance with one or more illustrative aspects described herein.

FIG. 3 illustrates an example quantum computer 300 for applying quantum annealing to a fault and solution dataset determining optimal diagnostic solutions regarding a detected fault on a device in a network. The quantum computer 300 may comprise one or more of a quantum annealing mechanism 310, host processor(s) 350, medium access control (MAC) processor(s) 355, physical layer (PHY) processor(s) 360, transmit/receive (TX/RX) module(s) 362, memory 340, and/or the like. One or more data buses may interconnect the quantum annealing mechanism 310, host processor(s) 350, MAC processor(s) 355, PHY processor(s) 360, TX/RX module(s) 362, and/or memory 340. The quantum annealing mechanism may be implemented using one or more integrated circuits (ICs), software, or a combination thereof, configured to operate as discussed herein. The quantum processor(s) 320, host processor(s) 350, MAC processor(s) 355, and PHY processor(s) 360, may be implemented, at least partially, on a single IC or multiple ICs. Memory 340 may be any memory such as a random-access memory (RAM), a read-only memory (ROM), a flash memory, or any other electronically readable memory, or the like.

Data or messages transmitted from and/or received at the quantum computer 300 may be encoded in one or more MAC data units and/or PHY data units. The MAC processor(s) 355 and/or the PHY processor(s) 360 of the quantum computer 300 may be configured to generate data units, and process received data units, that conform to any suitable wired and/or wireless communication protocol. For example, the MAC processor(s) 355 may be configured to implement MAC layer functions, and the PHY processor(s) 360 may be configured to implement PHY layer functions corresponding to the communication protocol. The MAC processor(s) 355 may, for example, generate MAC data units (e.g., MAC protocol data units (MPDUs)), and forward the MAC data units to the PHY processor(s) 360. The PHY processor(s) 360 may, for example, generate PHY data units (e.g., PHY protocol data units (PPDUs)) based on the MAC data units. The generated PHY data units may be transmitted via the TX/RX module(s) 362 over the private network 370. Similarly, the PHY processor(s) 360 may receive PHY data units from the TX/RX module(s) 362, extract MAC data units encapsulated within the PHY data units, and forward the extracted MAC data units to the MAC processor(s). The MAC processor(s) 355 may then process the MAC data units as forwarded by the PHY processor(s) 360.

One or more processors (e.g. the quantum processor(s) 320, the host processor(s) 350, the Mac processor(s) 355, the PHY processor(s) 360, and/or the like) of the quantum computer 300 may be configured to execute computer-readable instructions 344 stored in memory 340. The memory 340 may comprise one or more program module/ engines storing computer-readable instructions that, when executed by the one or more processors cause the quantum annealing mechanism 310 to perform one or more functions described herein. The one or more program modules/engines and/or databases may be stored by and/or maintained in different memory units of the quantum computer 300 and/or different computing devices that may form and/or otherwise make up the quantum computer 300. For example, the memory 340 may have, store, and/or comprise a fault and solution dataset 342 used by the quantum annealing mechanism to determine one or more diagnostic solutions to a fault detected on a computing device connected to the private network 370. The memory 340 may further comprise instructions that may be used by the quantum processor(s) 320 to perform various processing steps as described herein. For example, the memory 340 may store instructions that, when executed, cause the host processor(s) 350 to send instructions/data to the quantum annealing mechanism 310. The quantum processor(s) 320 may process data to generate an output, which may be retrieved by the host processor(s) 350 or stored in memory 340 updating the fault and solution dataset 342.

The quantum annealing mechanism 310 may comprise quantum processor(s) 320 and a quantum translator engine 330. The quantum processor 320 may comprise couplers 324, biases 326, and/or a plurality of qubits 322 that may be used in various quantum annealing processes and functions. The quantum translator engine 330 may interface/communicate with the memory 340 via a data bus. The quantum translator engine 330 may receive the fault and solution dataset 342 from memory 340. The quantum translator engine 330 may translate the fault and solution dataset 342, which may be encoded in classical binary format, to initialize a plurality of qubits 322 into states representing historical faults in computing devices and historical diagnostic solutions to the faults.

In one embodiment, a computing device may transmit detected fault empirical data, representing a software/hardware detected fault on the computing device, to the quantum computer 300 via the private network 370. The detected fault empirical data and the fault and solution dataset may be transmitted to the quantum annealing mechanism 310. The quantum annealing mechanism 310 may perform quantum annealing functions on the fault and solution dataset 342 in order to determine an optimal diagnostic solution or solutions to solve the detected fault on the computing device. As previously discussed, the quantum translator engine 330 may translate the fault and solution dataset 342, which may be encoded in classical binary format, to initialize a plurality of qubits 322 into states representing empirical data of historical faults/issues in computing devices and historical diagnostic solutions.

The term "qubit" or "quantum bit" as used herein, may refer to a quantum version of a binary digit (bit) in classical computing. The qubit is the basic unit of quantum information. Whereas a classical bit may be in one of two states, "0" and "1", a quantum bit may be in a linear combination of two orthogonal states denoted as "|0>" and "|1>." In general, a qubit leverages properties/features of quantum mechanics in a form of a two-state quantum-mechanical system. A qubit may be implemented in a variety of forms, such as, for example, polarizations of a photon, discrete energy levels of an ion, spin states of an electron, among others. For example, a spin of an electron may have two states of spin up or spin down. Additionally, a polarization of a single photon may lead to two states of vertical polarization or horizontal polarization. While classical bits may either be 'on' ('1') or 'off' ('0'), quantum mechanics allows qubits to have a coherent superposition of both states simultaneously, which is fundamental to quantum mechanics and to quantum computing. This superposition allows qubits to have an equal probability of being in either state, |0> and |1>. The states of the qubits correspond to different energy levels, with lower and higher energy level states.

In quantum annealing, the couplers 324 and biases 326 are applied to the plurality of qubits 322 in order to solve the problem, in this case, the optimal or most optimal diagnostic solution to a detected fault in a computing device. The couplers 324 connect the plurality of qubits 326 together taking advantage of the superposition and entanglement properties of qubits 326 in quantum mechanics. For example, a single qubit may have two possible states, |0> and |1>. When one qubit is connected or entangled with a second qubit by a coupler, a total of four states are now possible. Entangling the qubits together generates a uniform superposition of states across the plurality of qubits. The couplers 324 may also be programmed with a coupling strength parameter to ensure the states of the qubits are in the same state (e.g. |0>) or opposite states. Hence, a total of $N=2^n$ states may be represented by n qubits 322 when the couplers entangle the plurality of qubits together. The biases 326 are external magnetic fields that are applied to the qubits 322, changing the probability of the state the qubit is in. For example, applying a bias or external magnetic field to the plurality of qubits influences the probability of the plurality of qubits 322 ending in a state of a lower or higher energy level. This is especially appreciated in quantum annealing where the solution to the problem to be solved is found in the lowest measured energy level of the plurality of qubits 322. The biases 326 may also be programmed with a bias strength parameter to increase or decrease the probability of a plurality of qubits 322 ending in a lower or higher energy level state.

The couplers may entangle or connect the plurality of qubits together to generate a set of states in uniform superposition. Each state within the set of states corresponding to the uniform superposition represents a corresponding diagnostic solution. Each state corresponding to the uniform superposition may also have an identical or different probability of occurrence based on a first configuration of couplers entangling the plurality of qubits together and biases influencing the energy levels of the s. For example, if there are n qubits initialized for the quantum annealing mechanism, a total of $N=2^2$ states may be represented by the n qubits.

In one embodiment, the quantum annealing process starts on the plurality of qubits 322 initialized into states representing historical data associated with historical faults in computing devices and historical diagnostic solutions to the historical faults by preparing the quantum processor 320 of the quantum annealing mechanism 310 in the ground state of an initial Hamiltonian. A Hamiltonian is a known mathematical operator in the field of quantum mechanics to define the energy of a specific state(s) in a system. In the ground state of the initial Hamiltonian, the couplers 324 and biases 326 are not yet applied to the plurality of qubits 322. The plurality of qubits 322 in the ground state of the initial Hamiltonian may each start in superposition allowing each of the plurality of qubits to have an equal probability of being in either state, |0> and |1>. The initial Hamiltonian allows the ground state, or lowest measured energy level state, to be easily solved. Quantum annealing involves the adiabatic quantum computation of slowly switching from the initial Hamiltonian to a problem Hamiltonian during a time period. The initial Hamiltonian may also be referred to as the tunneling Hamiltonian. The quantum annealing process takes advantage of the tunneling properties of quantum mechanics. As the quantum annealing process switches from the tunneling Hamiltonian to the problem Hamiltonian, states with energy barriers between them may be tunneled through in order to determine the lowest measured energy level state. The problem Hamiltonian introduces the application of the couplers 324 and biases 326 to the plurality of qubits based on the detected fault empirical data according to a first configuration. The couplers 324 entangle the plurality of qubits together, generating a first set of states in uniform superposition. The first set of states are measured in terms of energy levels. The biases 326 influence the energy levels of the first set of states. The coupler strength parameter and bias strength parameter may be programmed so the qubits in the problem Hamiltonian return the lowest measured energy level state representing the optimal or most optimal diagnostic solution to the detected fault empirical data in a computing device when the quantum annealing process is finished. The quantum computer may measure the state within the first set of states with the lowest measured energy level, and/or read the plurality of qubits after the quantum annealing process finishes, to determine the optimal or most optimal diagnostic solutions to the detected fault. The quantum annealing process may determine first diagnostic solutions to the detected fault based on the detected fault empirical data according to a first configuration of couplers and biases.

After an initial quantum annealing process finishes, the quantum annealing process may be re-sampled based on the detected fault empirical data according to a first configuration of the couplers 324 and biases 326. In one example, the quantum annealing process may be re-sampled to determine second and/or additional diagnostic solutions to the detected fault based on the detected fault empirical data according to a second configuration of the couplers 324 and biases 326. The couplers 324 entangle the plurality of qubits together, generating a second set of states in uniform superposition. The second set of states are measured in terms of energy levels. The biases influence the energy levels of the second set of states. The quantum computer may measure the state within the second set of states with the lowest measured energy level to determine second and/or additional diagnostic solutions to the detected fault. In another example, the quantum annealing process may be re-sampled by re-programing the coupler strength parameter and/or bias strength parameter to determine additional diagnostic solutions.

The quantum annealing process may determine diagnostic solutions heuristically, where the determined diagnostic solutions are optimal or close to the most optimal diagnostic solutions. The adiabatic quantum computation of the quantum annealing process slowly switching from the initial Hamiltonian to the problem Hamiltonian may return an optimal diagnostic solution or the most optimal diagnostic solution to a detected fault optimization problem. The quantum annealing process may then be re-sampled to determine second and/or additional diagnostic solutions.

Figure 4:
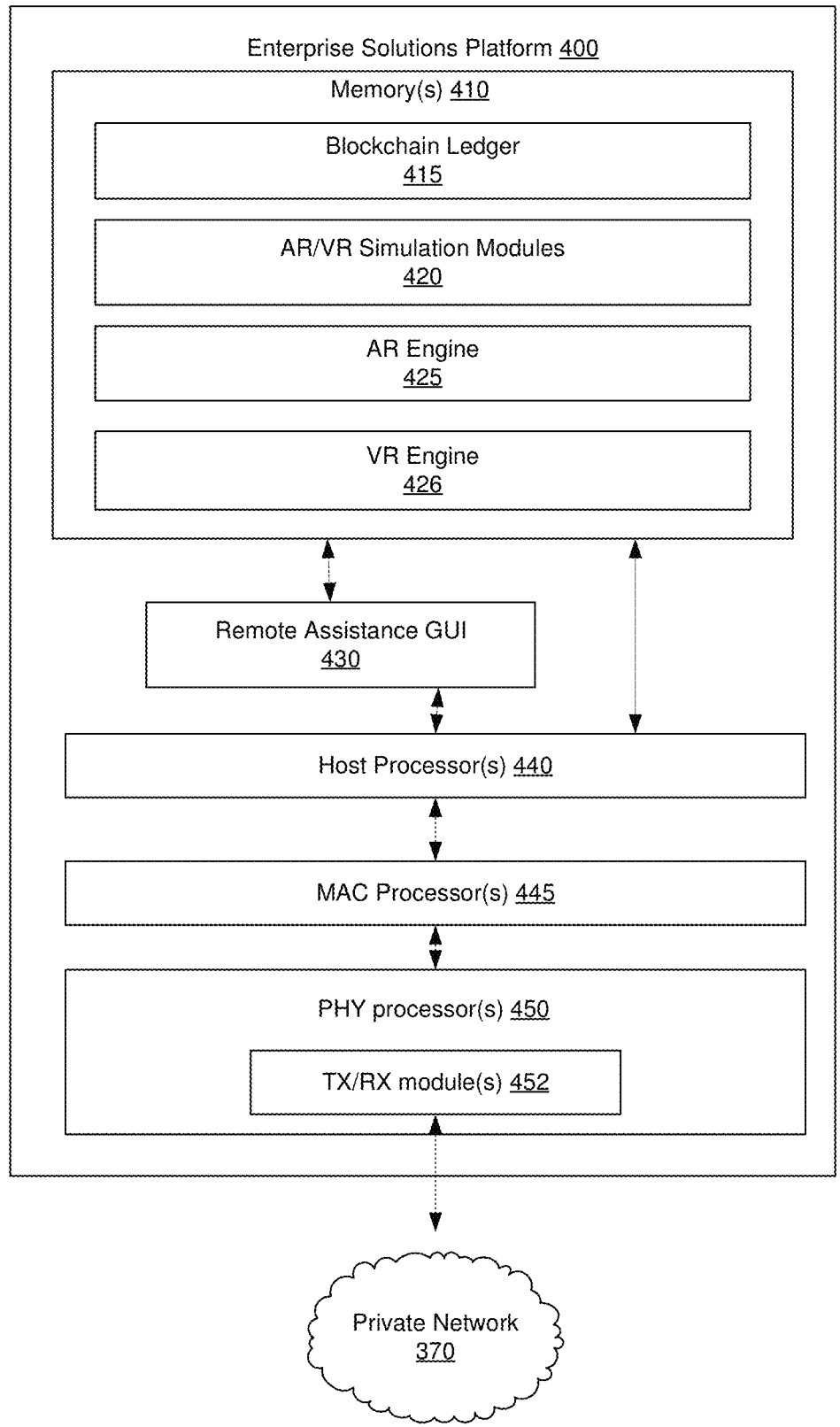
FIG. 4 illustrates an example enterprise solutions platform for determining diagnostic solutions in accordance with one or more illustrative aspects described herein.

FIG. 4 illustrates an example enterprise solutions platform 400 for determining diagnostic solutions based on historical data associated with historical faults and historical diagnostic solutions stored in a blockchain ledger. The enterprise solutions platform 400 may comprise one or more of memory 410, remote assistance GUI 430, host processor(s) 440, MAC processor(s) 445, PHY processor(s) 450, TX/RX module(s) 452, and/or the like. One or more data buses may interconnect the memory 410, remote assistance GUI 430, host processor(s) 440, MAC processor(s) 445, PHY processor(s) 450, and/or Tx/Rx module(s) 452 and/or the like. The enterprise solutions platform 400 may be implemented using one or more ICs, software, or a combination thereof, configured to operate as discussed below. The host processor(s) 440, the MAC processor(s) 445, and the PHY processor(s) 450 may be implemented, at least partially, on a single IC or multiple ICs. Memory 410 may be any memory such as a RAM, a ROM, a flash memory, or any other electronically readable memory, or the like. The host processor(s) 440, MAC processor(s) 445, PHY processor(s) 450, and/or Tx/Rx module(s) 452 may operate in a manner similar to the host processor(s) 350, MAC processor(s) 355, PHY processor(s) 360, and/or Tx/Rx module(s) 362 as described with respect to FIG. 3.

One or more processors (e.g., the host processor(s) 440, the MAC processor(s) 445, the PHY processor(s) 450, and/or the like) of the enterprise solutions platform 400 may be configured to execute computer-readable instructions stored in memory 410. The memory 410 may comprise one or more program modules/engines having instructions that when executed by the one or more processors cause the enterprise solutions platform 400 to perform one or more functions described herein. The one or more program modules/engines and/or blockchain ledger 415 may be stored by and/or maintained in different memory units of the enterprise solutions platform 400 and/or by different computing devices that may form and/or otherwise make up the enterprise solutions platform 400. The one or more program modules/engines may be AR/VR simulations modules 420, an AR engine 425, and/or a VR engine 425. The memory may have, store, and/or comprise a blockchain ledger 415 and/or a digital copy of the blockchain ledger 415 storing historical data associated with historical faults and historical diagnostic solutions.

In some embodiments, the enterprise solution platform 400 may be accessed by a user or technician through a device such as a computing device, tablet, phone, and/or other like devices. The enterprise solutions platform 400 may be accessed by a user or technician attempting to manually diagnosis and solve a specific fault detected on a computing device. A user or technician may input a specific fault detected by a computing device using the remote assistance GUI 430. The specific fault detected by the computing device is transmitted to the AR/VR simulation modules 420. The blockchain ledger 415 and or a digital copy of the blockchain ledger 415 is used by the AR/VR simulation modules 420 to extract the historical data associated with historical faults and historical diagnostic solutions acquired from a plurality of computing devices. The AR/VR simulation modules 420 may process the historical data based on the specific fault to determine specific diagnostic solutions to the specific fault. In other examples, the historical data may be processed based on the specific fault by the host processor(s) 440 an/or other processors in the enterprise solutions platform 400 that may be included in the AR/VR simulation modules 420. The AR/VR simulation modules 420 generate interactive AR/VR data for display on the remote assistance GUI 430 representing specific diagnostic solutions to the specific fault detected by the computing device. The AR/VR simulation modules 420 may use and/or include an AR engine 425 for generating interactive AR data and/or a VR engine 426 for generating interactive VR data. The AR/VR simulation modules 420 may transmit interactive AR/VR data to the remote assistance GUI 430. The remote assistance GUI 430 may display the interactive AR/VR data representing specific diagnostic solutions to the specific fault to a user of the computing device or a technician. The computing device may then troubleshoot the specific fault on the computing device according to the specific diagnostic solutions.

Figure 5A:
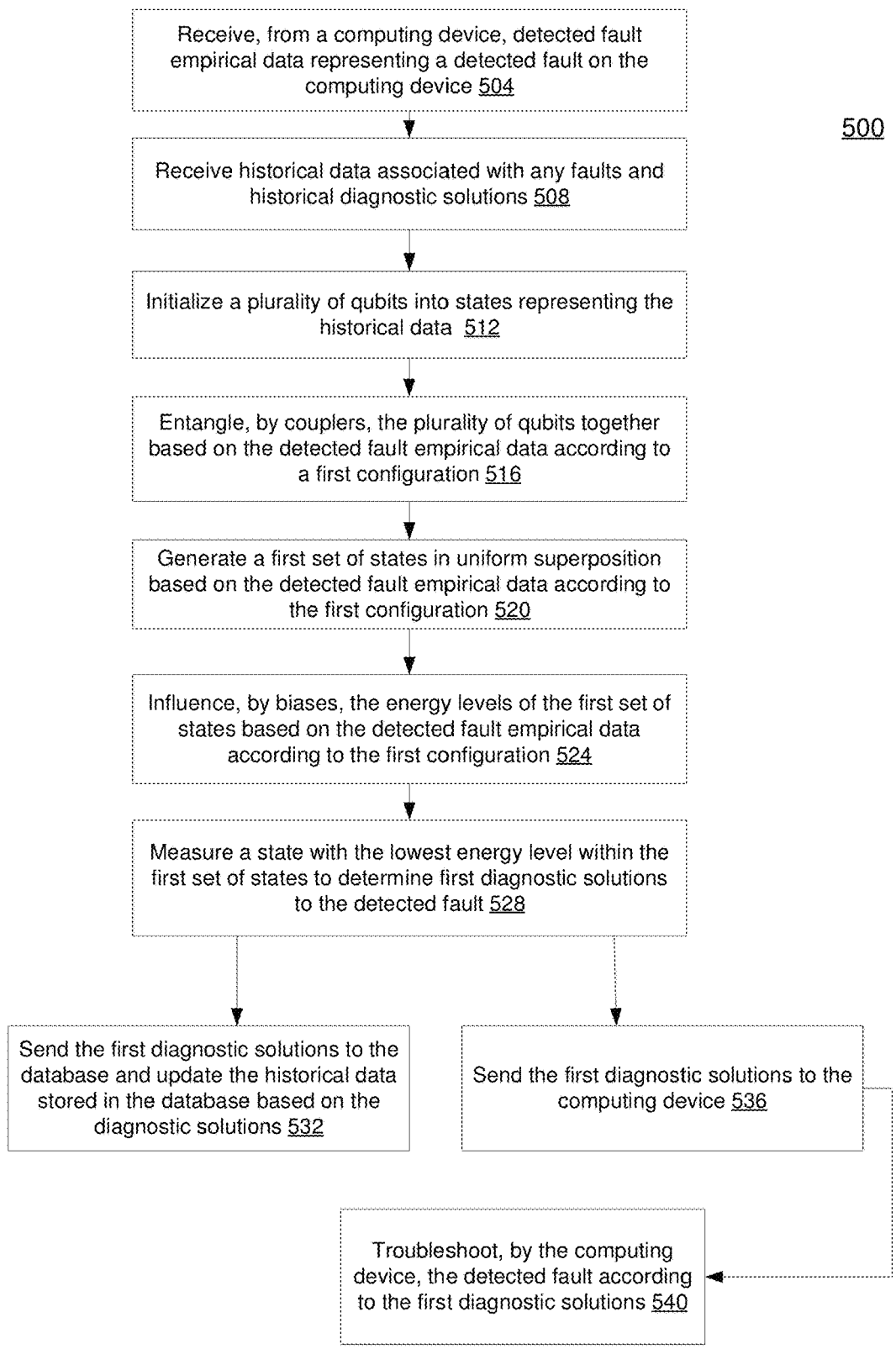
FIG. 5A illustrates an example flowchart for determining diagnostic solutions for a detected fault on a computing device in accordance with one or more illustrative aspects described herein.

FIG. 5A shows an example flowchart 500 for determining diagnostic solutions for a detected fault on a computing device using a quantum computer a database, and/or a blockchain ledger. The quantum computer may comprise a quantum annealing mechanism. The computing device may be one of a plurality of computing devices in a network. The network may be a P2P network. The database may store historical data associated with historical faults and historical diagnostic solutions found on a plurality of computing device in the network.

At step 504, the quantum computer may receive, from a computing device in a network, detected fault empirical data representing a detected fault on the computing device. The computer device may detect a fault within itself and transmit detected fault empirical data to the quantum computer. At step 508, the quantum computer may receive historical data associated with historical faults and historical diagnostic solutions found on a plurality of computing device in the network. The quantum computer may receive the historical data from a network node storing a blockchain ledger in a data store and/or a memory. The blockchain ledger stores the historical data. In another example, the quantum computer receives the historical data from the database storing the historical data. At step 512, the quantum computer may initialize a plurality of qubits into states representing the historical data associated with historical faults and historical diagnostic solutions found on the plurality of computing devices in the network. The plurality of qubits may be initialized by a quantum processor. At step 516, entangle, by couplers, the plurality of qubits together based on the detected fault empirical data according to a first configuration. In some embodiments, the couplers may be programmed by a coupler strength parameter. At step 520, generate a first set of states in uniform superposition based on the detected fault empirical data according to the first configuration. At step 524, influence, by biases, the energy levels of the first set of states based on the detected fault empirical data according to the first configuration. In some embodiments, the biases may be programmed by a bias strength parameter. At step 528, measure, by the quantum computer, a state with the lowest energy level within the first set of states to determine first diagnostic solutions to the detected fault.

In one embodiment, at step 532, the quantum computer may send the first diagnostic solutions to the database and update the historical data stored in the database based on the diagnostic solutions. The database sends the updated historical data to a network node in a P2P network and the network node adds the updated historical data to a blockchain ledger. In another embodiment, at step 536, the quantum computer sends the first diagnostic solutions to the computing device. At step 540, troubleshoot, by the computing device, the detected fault according to the first diagnostic solutions.

Figure 5B:
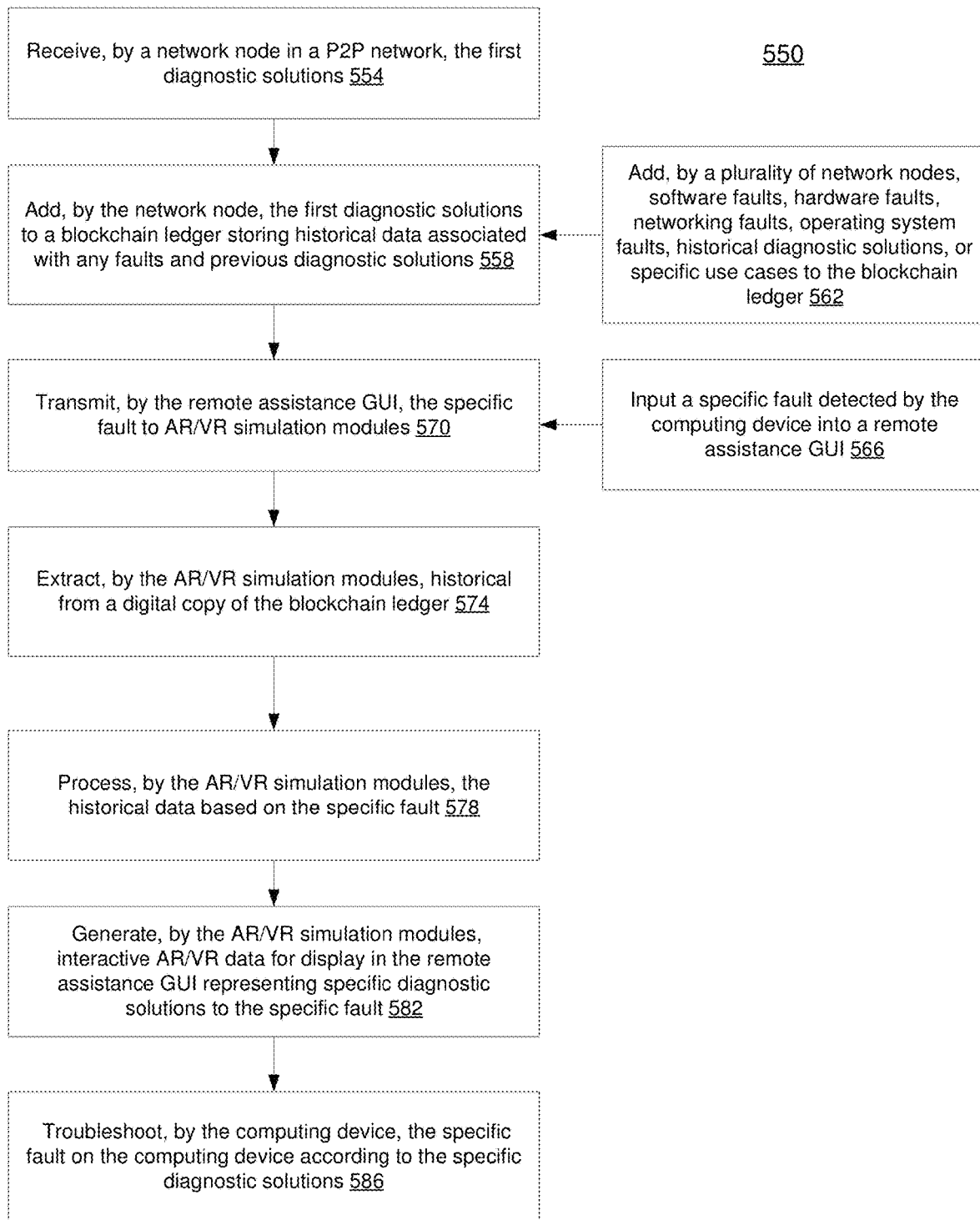
FIG. 5B illustrates an example flowchart for determining historical diagnostic solutions for detected faults in a computing device in accordance with one or more illustrative aspects described herein.

FIG. 5B shows an example flowchart 550 for determining specific and/or historical diagnostic solutions for detected faults in a user computing device on a peer-to-peer (P2P) network using a blockchain ledger and an enterprise solutions platform. The P2P network may comprise a plurality of network nodes for performing operations on the blockchain ledger. The plurality of network nodes may store the blockchain ledger in a data store and/or memory. The plurality of network nodes may comprise a plurality of computing devices on the P2P network. The computing device may be a network node. The enterprise solutions platform may include a digital copy of the blockchain ledger, artificial reality/virtual reality (AR/VR) simulation modules, and a remote assistance graphical user interface (GUI).

At step 554, a network node in a P2P network may receive the first diagnostic solutions from a database and/or the quantum computer. The network node may be the computing device. At step 558, the network node may add the first diagnostic solutions to a blockchain ledger storing historical data associated with historical faults and historical diagnostic solutions found on a plurality of computing devices. At step 562, a plurality of network nodes may add software faults, hardware faults, networking faults, operating system faults, historical diagnostic solutions, or specific use cases to the blockchain ledger through a secure log-in interface on the P2P network. In one example, a plurality of computing devices acting as network nodes in the P2P network may read historical data from the blockchain ledger to determine historical diagnostic solutions to faults detected on the plurality of computing devices.

At step 566, input a specific fault detected by the computing device using a remote assistance GUI on the enterprise solutions platform. At step 570, the remote assistance GUI may transmit the specific fault to AR/VR simulation modules. At step 574, the AR/VR simulation modules may extract historical from a digital copy of the blockchain ledger. At step 578, the AR/VR simulation modules may process the historical data based on the specific fault. At step 582 the AR/VR simulation modules may generate interactive AR/VR data for display in the remote assistance GUI representing specific diagnostic solutions to the specific fault. At step 586, troubleshoot, by the computing device, the specific fault on the computing device according the specific diagnostic solutions.

Figure 6:
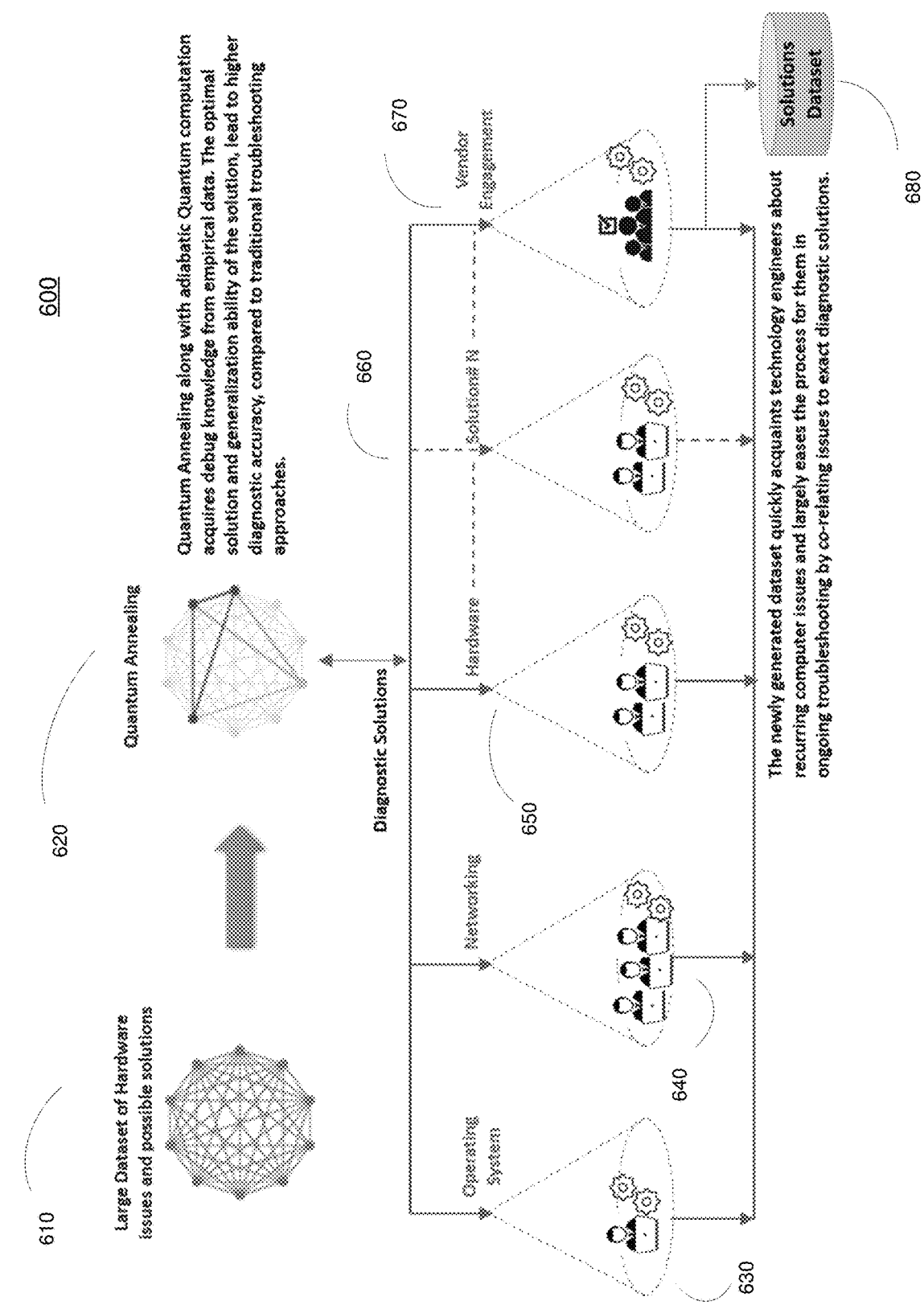
FIG. 6 illustrates a system using quantum annealing on a dataset to find specific diagnostic solutions to various types of detected faults on computing devices in accordance with one or more illustrative aspects described herein.

FIG. 6 illustrates a computing environment 600 using quantum annealing on a large dataset to find specific diagnostic solutions to various types of detected faults on computing devices. The system 600 may comprise one or more datasets 610 of historical data associated with historical faults and historical diagnostic solutions, quantum annealing mechanisms 620, and/or a solutions dataset 680. The solutions datasets 680 may include diagnostic solutions related to operating system solutions 630, networking solutions 640, hardware solutions 650, and/or software solutions or the like for detected faults on computing devices.

The quantum annealing mechanism 620 may perform one or more functions described herein on the datasets 610 of historical data associated with historical faults and historical diagnostic solutions to determine specific diagnostic solutions to specific faults detected on computing devices. The quantum annealing mechanism is capable of determining diagnostic solutions to each and every fault or issue on computing devices. For example, a user computing device may detect hardware fault empirical data representing a hardware fault on a computing device. The computing device may transmit the hardware fault empirical data to the quantum annealing mechanism 620. The quantum annealing mechanism 620 may perform one or more functions described herein on the datasets 610 of historical data associated with historical faults and historical diagnostic solutions to determine hardware solutions 650 to the hardware fault on the computing device. The hardware solutions 650 may be stored in the solutions dataset. The hardware solutions 650 may be identified as the specific diagnostic solution 660 to the hardware fault on the computing device by a vendor engagement module 670. The vendor engagement module 670 may comprise one or more devices (e.g. computing devices, computer systems, communication device, and the like) that may be connected via one or more networks (e.g. a private network and/or a public network). The vendor engagement module 670 may be used by a particular entity or enterprise, such as a financial institution or software vendor, and/or may be used by users of a computing device or technicians for solving computer related faults. The solutions dataset 680 may be used by technicians or technology engineers associated with the vendor engagement module 670 to learn about recurring computer issues or faults to ease the process of on-going troubleshooting by co-relating issues to specific/exact diagnostic solutions.

The quantum annealing mechanism improves accuracy and latency when determining diagnostic solutions in comparison to traditional troubleshooting approaches. Traditional troubleshooting approaches may include root cause chaining, knowledge based fuzzy logic, rule-based reasoning, model-based reasoning, and/or case-based reasoning analyses. The quantum annealing process may determine diagnostic solutions heuristically, where the determined diagnostic solutions are optimal or close to the most optimal diagnostic solutions. The adiabatic quantum computation of the quantum annealing process slowly switching from the initial Hamiltonian to the problem Hamiltonian may return an optimal diagnostic solution or the most optimal diagnostic solution to a detected fault optimization problem. The quantum annealing process may then be re-sampled to determine second and/or additional diagnostic solutions.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed:

1. A system for determining diagnostic solutions to a detected fault on a user computing device, the system comprising:
a quantum computer comprising:
a quantum processor comprising couplers, biases, and a plurality of qubits; and
a memory storing computer-readable instructions, that when executed by the quantum processor, cause the quantum computer to:
receive a detected fault empirical data representing the detected fault on the user computing device;
receive historical data associated with historical faults and historical diagnostic solutions;
initialize the plurality of qubits into states representing the historical data;
entangle, by the couplers, the plurality of qubits together based on the detected fault empirical data according to a first configuration;
generate a first set of states in uniform superposition based on the detected fault empirical data according to the first configuration, wherein the first set of states are measured in terms of energy levels;
influence, by the biases, the energy levels of the first set of states based on the detected fault empirical data according to the first configuration;
measure a state with a lowest energy level within the first set of states to determine first diagnostic solutions to the detected fault; and
send the first diagnostic solutions to the user computing device, wherein the user computing device troubleshoots the detected fault according to the first diagnostic solutions, wherein a network node in a peer-to-peer (P2P) network sends the historical data to the quantum computer, wherein the network node stores a blockchain ledger in a data store, wherein the P2P network comprises a plurality of network nodes for performing operations on the blockchain ledger, wherein the blockchain ledger stores the historical data associated with historical faults and historical diagnostic solutions.

2. The system of claim 1, wherein the instructions that, when executed by the quantum processor, cause the quantum computer to:
send the first diagnostic solutions to a database, wherein the database updates the historical data stored in the database based on the first diagnostic solutions, wherein the database sends the updated historical data to the network node.

3. The system of claim 2, wherein the network node is configured to:

receive the updated historical data from the database; and add the updated historical data to the blockchain ledger.

4. The system of claim 3, wherein the plurality of network nodes in the P2P network read the updated historical data from the blockchain ledger to determine historical diagnostic solutions to faults detected on a plurality of user computing devices.

5. The system of claim 1, wherein the plurality of network nodes are configured to add software faults, hardware faults, networking faults, operating system faults, historical diagnostic solutions, or specific use cases to the blockchain ledger through a secure log-in interface on the P2P network.

6. The system of claim 1, further comprising
an enterprise solutions platform comprising:
a digital copy of the blockchain ledger;
artificial reality/virtual reality (AR/VR) simulation modules; and
and a remote assistance graphical user interface (GUI), wherein a specific fault detected by the user computing device is input into the remote assistance GUI, wherein the remote assistance GUI transmits the specific fault to the AR/VR simulation modules, wherein the AR/VR simulation modules extract the historical data from the digital copy of the blockchain ledger, wherein the AR/VR simulation modules process the historical data based on the specific fault, wherein the AR/VR simulation modules generate interactive AR/VR data for display on the remote assistance GUI representing specific diagnostic solutions to the specific fault, wherein the user computing device troubleshoots the specific fault according to the specific diagnostic solutions.

7. The system of claim 1, wherein the couplers are programmed by a coupling strength parameter and the biases are programmed by a bias strength parameter based on the detected fault empirical data.

8. The system of claim 1, wherein the memory stores the computer-readable instructions that, when executed by the quantum processor, cause the quantum computer to:
entangle, by the couplers, the plurality of qubits together based on the detected fault empirical data according to a second configuration;
generate a second set of states in uniform superposition based on the detected fault empirical data according to the second configuration, wherein the second set of states are measured in terms of energy levels;
influence, by the biases, the energy levels of the second set of states based on the detected fault empirical data according to the second configuration; and
measure a state with a lowest energy level within the second set of states to determine second diagnostic solutions to the detected fault.

9. A method for determining diagnostic solutions to a detected fault on a computing device, the method comprising:
receiving, by a quantum computer and from the computing device, a detected fault empirical data representing the detected fault on the computing device;
receiving, by the quantum computer, historical data associated with historical faults and historical diagnostic solutions;
initializing a plurality of qubits into states representing the historical data;
entangling, by couplers, the plurality of qubits together based on the detected fault empirical data according to a first configuration;
generating a first set of states in uniform superposition based on the detected fault empirical data according to the first configuration, wherein the first set of states are measured in terms of energy levels;
influencing, by biases, the energy levels of the first set of states based on the detected fault empirical data according to the first configuration;
measuring a state with a lowest energy level within the first set of states to determine first diagnostic solutions to the detected fault;
sending the first diagnostic solutions to the computing device, wherein the computing device troubleshoots the detected fault according to the first diagnostic solutions; and
sending, by a network node in a P2P network, the historical data to the quantum computer, wherein the network node stores a blockchain ledger in a data store, wherein the P2P network comprises a plurality of network nodes for performing operations on the blockchain ledger, wherein the blockchain ledger stores the historical data associated with historical faults and historical diagnostic solutions.

10. The method of claim 9, further comprising:
sending, by the quantum computer, the first diagnostic solutions to a database;
updating the historical data stored in the database based on the first diagnostic solutions; and
sending, by the database, the updated historical data to the network node.

11. The method of claim 10, further comprising:
receiving, by the network node, the updated historical data; and
adding, by the network node, the updated historical data to the blockchain ledger.

12. The method of claim 11, further comprising:
reading, by the plurality of network nodes and from the blockchain ledger, the historical data to determine historical diagnostic solutions to faults detected on a plurality of computing devices.

13. The method of claim 9, further comprising:
adding, by the plurality of network nodes, software faults, hardware faults, networking faults, operating system faults, historical diagnostic solutions, or specific use cases to the blockchain ledger through a secure log-in interface on the P2P network.

14. The method of claim 9, further comprising:
inputting a specific fault detected by the computing device into a remote assistance GUI;
transmitting, by the remote assistance GUI, the specific fault to AR/VR simulation modules;
extracting, by the AR/VR simulation modules, historical data from a digital copy of the blockchain ledger;
processing, by the AR/VR simulation modules, the historical data based on the specific fault;
generating, by the AR/VR simulation modules, interactive AR/VR data for display in the remote assistance GUI representing specific diagnostic solutions to the specific fault; and
troubleshooting, by the computing device, the specific fault according to the specific diagnostic solutions.

15. The method of claim 9, further comprising:
programming, according to the detected fault empirical data, the couplers by a coupler strength parameter and the biases by a bias strength parameter.

16. The method of claim 9, further comprising:
- entangling, by the couplers, the plurality of qubits together based on the detected fault empirical data according to a second configuration;
- generating a second set of states in uniform superposition based on the detected fault empirical data according to the second configuration, wherein the second set of states are measured in terms of energy levels;
- influencing, by the biases, the energy levels of the second set of states based on the detected fault empirical data according to the second configuration; and
- measuring a state with a lowest energy level within the second set of states to second determine diagnostic solutions to the detected fault.

17. A non-transitory computer-readable medium storing computer-executable instructions that, when executed by a quantum processor, cause a quantum computer comprising couplers, biases, and a plurality of qubits to:
- receive, from a computing device, a detected fault empirical data representing a detected fault on the computing device;
- receive historical data associated with historical faults and historical diagnostic solutions;
- initialize the plurality of qubits into states representing the historical data;
- entangle, by the couplers, the plurality of qubits together based on the detected fault empirical data according to a configuration;
- generate a set of states in uniform superposition based on the detected fault empirical data according to the configuration, wherein the set of states are measured in terms of energy levels;
- influence, by the biases, the energy levels of the set of states based on the detected fault empirical data according to the configuration;
- measure a state with a lowest energy level within the set of states to determine diagnostic solutions to the detected fault; and
- send the diagnostic solutions to the computing device, wherein the computing device troubleshoots the detected fault according to the diagnostic solutions, wherein a network node in a peer-to-peer (P2P) network sends the historical data to the quantum computer, wherein the network node stores a blockchain ledger in a data store, wherein the P2P network comprises a plurality of network nodes for performing operations on the blockchain ledger, wherein the blockchain ledger stores the historical data associated with historical faults and historical diagnostic solutions.

18. The non-transitory computer readable medium of claim 17, wherein the couplers are programmed by a coupling strength parameter and the biases are programmed by a bias strength parameter based on the detected fault empirical data.

* * * * *